United States Patent [19]
Tenne

[11] 3,733,988
[45] May 22, 1973

[54] LIGHT MEASURING APPARATUS FOR A SINGLE-LENS REFLEX CAMERA

[75] Inventor: Lave Tenne, Norbyvallda, Sweden

[73] Assignee: Fritz Victer Hasselblad, Goteborg, Sweden

[22] Filed: June 21, 1971

[21] Appl. No.: 154,768

[52] U.S. Cl. .................................. 95/42, 95/10 PO
[51] Int. Cl. ............................................ G03b 19/12
[58] Field of Search ............................................ 95/42

[56] References Cited

UNITED STATES PATENTS 3,601,027  8/1971  Ono .................................. 95/42
3,468,233  9/1969  Schmidt .......................... 95/42

Primary Examiner—John M. Horan
Assistant Examiner—M. D. Harris
Attorney—Sommers & Young

[57] ABSTRACT

A single-lens reflex camera comprises an exposure meter disposed in the ray path of the camera. A portion of the viewfinder mirror surface is made partially specular to allow for the passage of the measuring light, and the viewfinder mirror holder on its rear side is provided with a folding deviating mirror to deflect the light in the direction of a measuring cell. The motion of the deviating mirror which deflects the measuring light to a measuring cell disposed in a side wall of the camera housing is controlled by a parallel motion guide bar which is a part of the viewfinder mirror linkage.

3 Claims, 5 Drawing Figures

LIGHT MEASURING APPARATUS FOR A SINGLE-LENS REFLEX CAMERA

BACKGROUND OF THE INVENTION

It is previously known in exposure meters in single-lens reflex cameras based on ray path measurement to make part of the viewfinder mirror surface, or the entire surface, partially specular to allow for the passage of the measuring light. The measuring light, on the rear side of the viewfinder folding mirror, impinges upon a deviating mirror, which deflects the light in a direction toward a measuring cell usually provided in the camera bottom. When the viewfinder mirror is in its folded-up position, no part of the deviating mirror on the rear side of the viewfinder mirror can be permitted to extend downwardly into the ray path of the camera. In many cases, therefore, the deviating mirror must be made folding.

In a known construction with the measuring cell disposed in the bottom of the camera housing, the deviating mirror is folded up against the rear side of the viewfinder mirror and thereby simultaneously covers the partially specular viewfinder mirror, so that light cannot penetrate via the viewfinder into the camera and cause damage on the film. In this case, the axle, about which the deviating mirror turns, extends parallel to the front and rear edges of the viewfinder mirror. It is thereby possible, by using a relatively simple linkage, to operate the deviating mirror by means of the viewfinder mirror mechanism. However, if it is desirable or necessary, for constructional reasons, to place the measuring cell in one side wall of the camera housing, the pivot axis of the deviating mirror does not any longer extend parallel to the front and rear edges of the viewfinder mirror and this renders it impossible to utilize the known control means for the deviating mirror.

SUMMARY OF THE INVENTION

The arrangement according to the invention provides a simple and reliable control of a deviating mirror, which directs the measuring light in the direction to a measuring cell disposed in one side wall of the camera housing. The deviating mirror is controlled by the control mechanism of the viewfinder mirror in such a way, that a parallel motion guide bar already provided for control joints disposed on both sides of the viewfinder mirror, is utilized for the control. Said joints carry the viewfinder mirror holder and are part of an already known viewfinder mirror mechanism. The parallel motion guide bar extending transversely across the rear surface of the viewfinder mirror changes its distance to the viewfinder mirror in response to the actual position of the viewfinder mirror. When the viewfinder mirror is folded down, the parallel motion guide bar is at its greatest distance from the viewfinder mirror, i.e., when the deviating mirror is to be in folded-out position. Upon folding the viewfinder mirror upwards out of the camera ray path, the parallel motion guide bar gradually approaches the viewfinder mirror and is in its end position very close to said bar, i.e., when the deviating mirror is to be in folded-in position. By mounting the deviating mirror holder on a hinge means, and by providing a spring tending to retain the holder in folded-out position, and further by giving the edge of the deviating mirror holder facing the parallel motion guide bar a suitable curved shape, and possibly by a modification of the originally straight parallel motion guide bar, the deviating mirror can be controlled by the parallel motion guide bar, along which the edge of the deviating mirror slides.

The position of the measuring cell at one side wall of the camera housing is related to a given angle between a mandrel of the hinge means and the parallel motion guide bar and also by a given folding-out angle for the deviating mirror holder. To facilitate the inward and outward folding of the deviating mirror, the inclination of the parallel motion guide bar to the deviating mirror holder, as well as the inclination of that part of the deviating mirror holder sliding against the parallel motion guide bar, are so adjusted that the mechanism moves as softly and smoothly as possible. The measuring cell can be placed in one or the other of the camera housing side walls, as deemed most suitable from a construction point of view, provided that the deviating mirror mechanism is not made self-locking by the location chosen for the measuring cell.

BRIEF DESCRIPTION OF THE DRAWINGS

A preferred embodiment of the invention is described in greater detail in the following, with reference to the accompanying drawings, in which.

DETAILED DESCRIPTION OF THE PREFERRED EMBODIMENT

Figure 1:
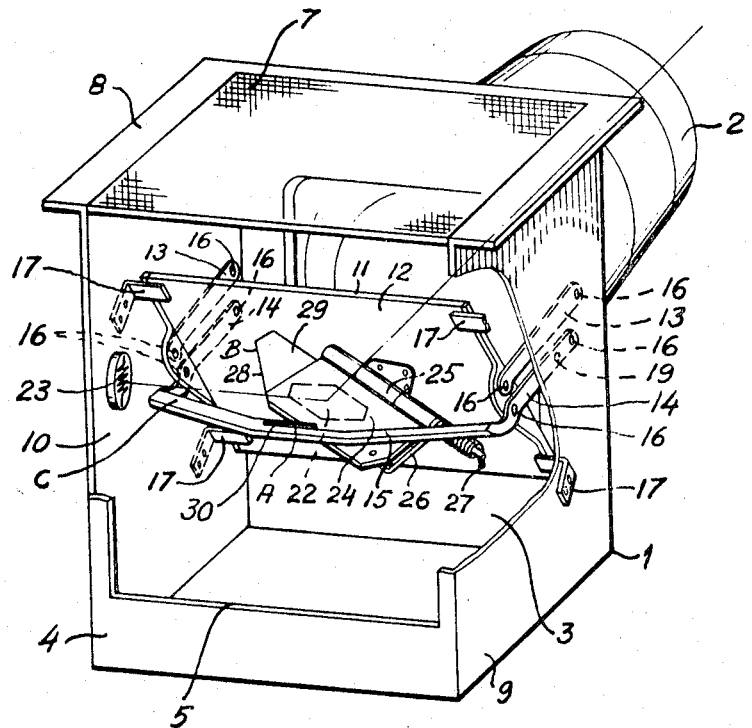
FIG. 1 shows in a perspective and schematic way a camera housing with the viewfinder mirror mechanism in folded-down position, parts of the camera housing being cut away.
Figures 2, 3:
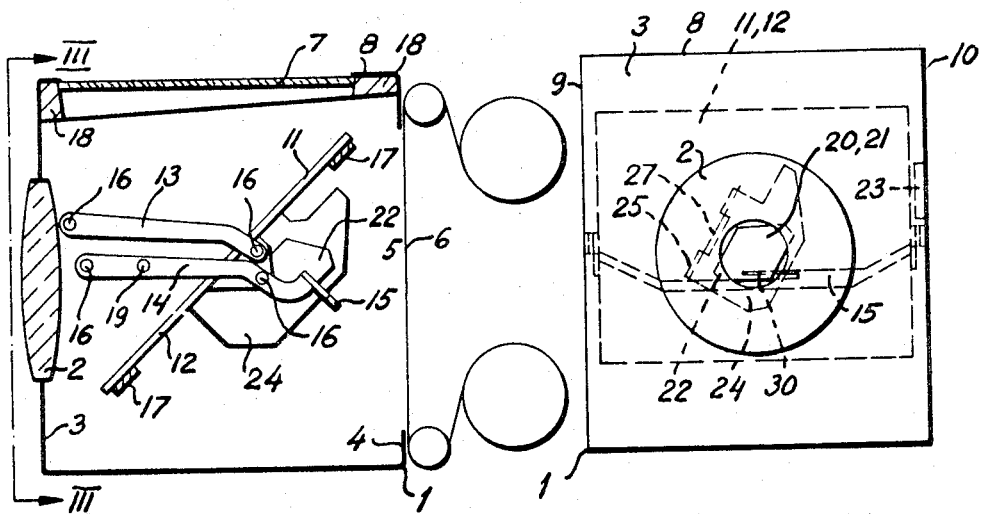
FIG. 2 shows a longitudinal section through a camera housing according to FIG. 1.
FIG. 3 shows the camera housing seen in the direction III—III in FIG. 2, FIG. 4 corresponds to FIG. 2, but with folded-up viewfinder mirror.
Figure 4:
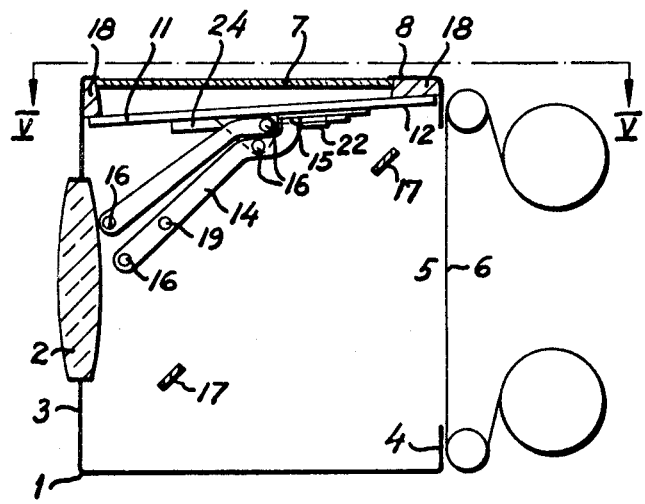
Figure 5:
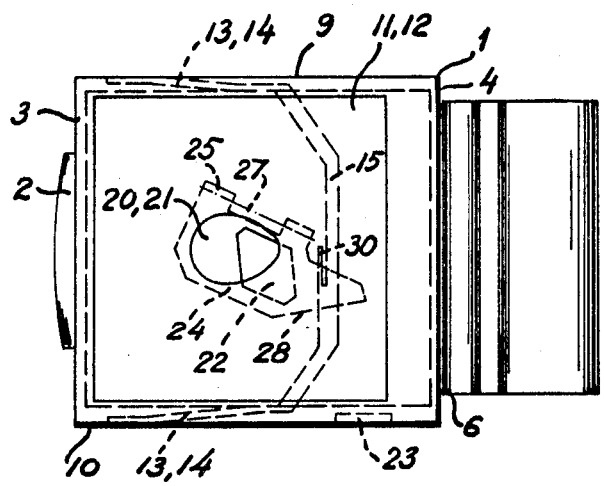
FIG. 5 shows the camera housing seen in the direction V-V in FIG. 4.

A camera housing 1 for a single-lens reflex camera, FIG. 1, is provided with a lens 2 mounted stationary or exchangeably in the front wall 3 of the camera housing 1. The rear wall 4 of the camera housing includes a film gate 5 behind which a film 6 runs (FIGS. 2, 4 and 5). Into the upper wall 8 of the camera housing 1 a ground-glass screen 7 is inserted. Between the right-hand and left-hand side wall 9 and, respectively, 10 of the camera housing, a combined viewfinder mirror and deviating mirror mechanism is provided, of which the viewfinder mirror mechanism is of known construction, but the mechanism of the deviating mirror constitutes a part of the present invention. A viewfinder mirror 11 is supported in a viewfinder mirror holder 12, which is suspended in two pairs of hinged arms — simple upper hinged arms 13, and lower hinged arms 14 — the latter being extended somewhat behind the viewfinder mirror holder 12 and connected with each other to a rigid U-shaped bow by means of a parallel motion guide bar 15. The hinged arms 13, 14 are pivoted on journals 16 at the viewfinder mirror holder 12 and, respectively, at the side walls 9, 10. The viewfinder mirror holder 12, in folded-down position, is pressed by a spring means (not shown) against stationary supports 17, and the viewfinder mirror 11, also by action of said spring means, presses in folded-up position against a gasket 18 below the ground-glass screen 7. The viewfinder mirror mechanism is operated between folded-up position, FIGS. 4 and 5, and folded-down position, FIGS. 1-3, or vice versa, by a drive pin 19 on one of the lower hinged arms 14 connected to a drive mechanism (not shown).

The exposure meter of the camera operates upon the known principle of ray path measuring or, more accurately, point measuring. The viewfinder mirror 11 includes a central portion 20 (FIG. 3), which partially is made specular so that when the viewfinder mirror is folded down, the light from the lens 2 is distributed that part thereof is reflected upwardly against the ground-glass screen 7 and a further part, the measuring light, passes through the viewfinder mirror 11. Alternatively, the entire surface of the viewfinder mirror is made partially specular. The measuring light continues its way through a hole 21 in the viewfinder mirror holder 12 corresponding to said portion 20, which hole defines the measuring light when the entire surface of the viewfinder mirror is made partially specular, and impinges upon a deviating mirror 22, which deflects the measuring light to a measuring cell 23 in the form, for example, of a photoresistor mounted in the left-hand side wall 10 of the camera housing 1. The ray path of the measuring light is shown in FIG. 1.

The deviating mirror 22 which, according to the optical conditions in the individual case, may be concave, plane or possibly convex is rigidly mounted on a folding deviating mirror holder 24, which in its turn is mounted on a hinge means 25 secured on the viewfinder mirror holder 12. A helical spring 26 mounted on the extended mandrel 27 of the hinge means 25 acts with its free ends on the viewfinder mirror holder 12 and, respectively, deviating mirror holder 24, thereby tending to fold out the deviating mirror holder 24. The holder 24 thereby moves outwardly so that its outer edge 28 rests against the parallel motion guide bar 15.

The distance between the parallel motion guide bar 15 and the view-finder mirror holder 12 is the greatest when the viewfinder mirror 11 is in folded-down position (FIGS. 1 and 2), and it gradually is reduced to a minimum value when the viewfinder mirror 11, upon being folded up, arrives at its upper end position (FIG. 4). This change in distance between the parallel motion guide bar 15 and the viewfinder mirror holder 12 is utilized for the motion control of the deviating mirror holder 24. The deviating mirror holder 24 has one short side extended and so tapering outwardly that its outer edge 28 between the points A and B, FIG. 1, slides against the parallel motion guide bar 15 between the points A and C when the viewfinder mirror 11 is being folded upwards. Thereby the deviating mirror holder 24 is folded inwardly against the viewfinder mirror holder 12 and covers in a light-tight manner the hole 21.

In folded-up position, the parallel motion guide bar 15 rests in a sunk portion 29 of the deviating mirror holder 24, the depth of said sunk portion being adjusted to the parallel motion guide bar. Said bar, as shown in the embodiment, may be provided with a bulge facing away from the viewfinder mirror holder 12 and have a straight central portion, or it may alternatively be given an entirely straight shape. The shape of the deviating mirror holder 24 and the distance of the parallel motion guide bar 15 from the viewfinder mirror holder 12 then are adjusted accordingly. For rendering possible a comfortable setting of the angular position of the deviating mirror in this folded-out position, that portion of the parallel motion guide bar 15 against which the deviating mirror holder 12 slides, is formed as a tongue, which, for setting the angle position according to demand, is bent in the direction to or from the deviating mirror holder 24.

The invention is not restricted to the embodiment shown in the drawings and described above, but may be modified in its details without leaving the scope of the basic inventive idea. The measuring cell, in a mirror-inverted embodiment of the construction, may also be placed in the right-hand side wall 9 of the camera housing 1.

What I claim is:

1. In a single lens reflex camera, apparatus for the deflection of light from the ray path of the lens to a measuring cell in an exposure meter including:
   a folding viewfinder mirror,
   means for actuating said viewfinder mirror comprising a parallel motion guide bar disposed behind said viewfinder mirror and a pair of hinged arms on the respective sides of the said viewfinder mirror which are interconnected by said guide bar,
   the distance between said parallel motion guide bar and said viewfinder mirror being the greatest when the viewfinder mirror is in folded-down position and reducing to a minimum when the viewfinder mirror is in its folded-up position,
   said viewfinder mirror having at least a portion thereof which is partially specular to permit the passage of measuring light,
   a folding deviating mirror mounted at the rear side of the viewfinder mirror in such manner as to have impinge thereupon the light which passes through the partially specular portion of the viewfinder mirror and being further arranged so as to deflect the light which impinges thereupon to a measuring cell mounted in the interior of the camera,
   a holder for said deviating mirror and means supporting said holder in such manner that its axis of rotation forms an angle with said parallel motion guide bar,
   spring means normally maintaining an edge of said deviating mirror holder in folded-out position against the parallel motion guide bar,
   said edge of said deviating mirror holder sliding against the parallel motion guide bar when said bar upon forward and downward folding of the viewfinder mirror moves relative to the viewfinder mirror.

2. The apparatus of claim 1 in which said deviating mirror holder is so mounted on the viewfinder mirror holder that said deviating mirror deflects the measuring light to a measuring cell disposed in one side wall of the camera housing.

3. The apparatus of claim 1 wherein an edge of said parallel motion guide bar is provided with a tongue which can be bent toward or away from said deviating mirror holder to provide for adjustment of the angle of the deviating mirror in its folded-out position.

* * * * *